United States Patent Office 3,726,880
Patented Apr. 10, 1973

3,726,880
ORGANIC AMIDES AND METHODS FOR
THEIR PRODUCTION
David B. Capps, Ann Arbor, Mich., assignor to Parke,
Davis & Company, Detroit, Mich.
No Drawing. Filed Sept. 7, 1971, Ser. No. 178,467
Int. Cl. C07d 31/50
U.S. Cl. 260—294.8 E    7 Claims

ABSTRACT OF THE DISCLOSURE

Carbamoylmethyl esters of 5-chlorodithio-2-pyridine-carbamic acid optionally having various forms of substitution on the amide nitrogen atom. The compounds are antiparasitic agents having nematocidal activity. They can be produced by reacting a tertiary amine salt of 5-chlorodithio-2-pyridine-carbamic acid with a 2-haloacetamide compound. Certain of the compounds can also be produced by reacting 3-(5-chloro-2-pyridyl)rhodanine with ammonia or a primary amine.

SUMMARY AND DETAILED DESCRIPTION

The present invention relates to new organic amides. More particularly, the invention relates to certain carbamoylmethyl esters of 5-chlorodithio-2-pyridinecarbamic acid and to methods for their production. The compounds of the invention can be represented by the formula

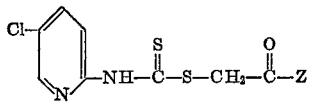

in which Z represents 1-pyrrolidinyl, piperidino, 2,6-dimethylpiperidino, 4 - [(lower alkoxy)carbonyl]-1-piperazinyl, or a group of the formula $$-NR^1R^2$$

in which $R^1$ represents hydrogen, lower alkyl (lower alkoxy)-lower alkyl, or benzyl and $R^2$ represents hydrogen, lower alkyl, or (lower alkoxy)lower alkyl. The lower alkyl groups are preferably alkyl groups of not more than 6 carbon atoms. The lower alkoxy groups are preferably alkoxy groups of not more than 4 carbon atoms.

In accordance with the invention, the compounds of the foregoing formula can be produced by reacting a tertiary amine salt of 5-chlorodithio-2-pyridinecarbamic acid having the formula

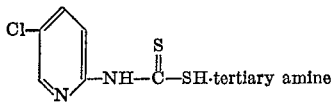

with a 2-haloacetamide compound of the formula

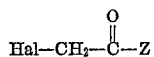

where Z is as defined before and Hal represents halogen, preferably chlorine or bromine. In the tertiary amine salt of 5-chlorodithio-2-pyridinecarbamic acid, the tertiary amine selected is preferably one having a pKa greater than 9. Examples of such tertiary amines are triethylamine, triisobutylamine, trimethylamine, tripropylamine, N-methylpiperidine, N,N - dimethylbenzylamine, N,N-diethylbenzylamine, and N-methyldiethylamine. A preferred tertiary amine is triethylamine. Some suitable solvents for the reaction are water; a lower alkanol such as methanol, ethanol, or isopropyl alcohol; a tertiary amide such as N,N-dimethylformamide, N,N-dimethylacetamide, or N-methyl-2-pyrrolidinone; an ether such as diethyl ether, dioxane, or tetrahydrofuran; acetonitrile; or mixtures thereof. A preferred solvent is N,N-dimethylacetamide. The reactants can be employed in approximately equimolar quantities or, if desired, a moderate excess of either can be used. A 10 to 20% excess of the 2-haloacetamide compound is preferred. The time and temperature of the reaction are not particularly critical. In general, the reaction can be carried out at a temperature from about —10 to 75° C. or the reflux temperature of the solvent for from 30 minutes to 10 hours, with the longer times being used at the lower temperatures. Preferred conditions are from 10 to 40° C. for a reaction time of 1 to 4 hours. The product is isolated by any of a number of conventional procedures such as extraction or precipitation.

Also in accordance with the invention, those compounds of the invention that can be represented by the formula

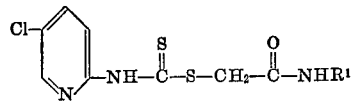

can be produced by reacting 3-(5-chloro-2-pyridyl)rhodanine of the formula

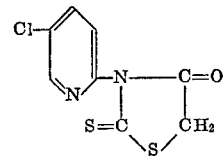

with ammonia or a primary amine of the formula $$R^1\!-\!NH_2$$

where $R^1$ is as defined before. Some suitable solvents for the reaction are a lower alkanol such as methanol, ethanol, or isopropyl alcohol; a chlorinated hydrocarbon such as chloroform or dichloromethane; an ether such as diethyl ether, dioxane, or tetrahydrofuran; acetonitrile, or mixtures thereof. A preferred solvent is acetonitrile. The reactants can be employed in approximately equimolar quantities although it is preferred to use an excess of ammonia or the primary amine. The time and temperature of the reaction are not particularly critical. In general, the reaction can be carried out at a temperature from about —10 to 75° C. or the reflux temperature of the solvent for from 5 minutes to 20 hours, with the longer times being used at the lower temperatures. Preferred conditions are from 0 to 35° C. for a reaction time of 20 minutes to 2 hours. The product is isolated by any of a number of conventional procedures such as extraction or precipitation. Using the preferred solvent acetonitrile, the product often precipitates or crystallizes from the mixture as the reaction proceeds.

Many of the starting materials required in the foregoing processes are known chemical compounds and others can be prepared by a variety of methods as illustrated in greater detail hereinafter. Tertiary amine salts of 5-chlorodithio-2-pyridinecarbamic acid can be prepared by reacting 2-amino-5-chloropyridine with carbon disulfide and a tertiary amine in a solvent such as pyridine. 3-(5-chloro-2-pyridyl)rhodanine can be prepared by heating 5-chlorodithio-2-pyridinecarbamic acid, carboxymethyl ester with acetic anhydride. The 5-chlorodithio-2-pyridinecarbamic acid, carboxymethyl ester can be prepared by reacting a tertiary amine salt of 5-chlorodithio-2-pyridinecarbamic acid with sodium chloroacetate in aqueous ethanol followed by acidifying the product.

The compounds of the invention can exist in anhydrous form as well as in solvated, including hydrated, forms. In general, the hydrated forms and the solvated forms with pharmaceutically-acceptable solvents are equivalent to the anhydrous or unsolvated form for the purposes of the invention.

The compounds of the invention are new chemical compounds of value as pharmacological agents and as chemical intermediates. They are antiparasitic agents and especially nematocidal agents. They also exhibit antiviral activity, for example against rhinovirus. Their activity as nematocidal agents can be demonstrated against the parasite *Nematospiroides dubius* in mice. Mice infected with this intestinal parasite are given a test compound by gavage. The selected dose is divided into two portions and both portions are given the same day. The effectiveness of the test compound is expressed as an approximate mean effective dose, $ED_{50}$, which is the dose that reduces the worm burden in treated animals by 50%. The following $ED_{50}$ values were found for representative compounds of the invention. 5 - chlorodithio - 2-pyridinecarbamic acid, carbamoylmethyl ester, less than 4 mg./kg.; 5-chlorodithio-2-pyridinecarbamic acid, (ethylcarbamoyl)methyl ester, 4 mg./kg.; 5-chlorodithio-2-pyridinecarbamic acid, (1-pyrrolidinylcarbonyl)methyl ester, 8 mg./kg.; 5-chlorodithio - 2 - pyridinecarbamic acid, (dipropylcarbamoyl) methyl ester, 8 mg./kg. By a similar test procedure, activity can be demonstrated against the parasite *Syphacia obvelata* in mice. The compounds of the invention are active against hookworms (*Ancylostoma caninum*) in dogs. For example, 5-chlorodithio-2-pyridinecarbamic acid, carbamoylmethyl ester is active in a single oral dose of 6.25 mg./kg. Limited activity is also observed against ascarids (*Toxocara canis*) in dogs. The compounds are usually administered orally, although for certain purposes parenteral or topical administration can be used.

The invention is illustrated by the following examples.

EXAMPLE 1

A reaction mixture is prepared by adding 10.3 g. of 2-chloroacetamide to a suspension of 30.6 g. of 5-chlorodithio - 2 - pyridinecarbamic acid, salt with one formula weight triethylamine, in 140 ml. of N,N-dimethylacetamide. The mixture is stirred at room temperature for 1.5 hours and filtered. The filtrate is diluted with ice water and the insoluble product is collected on a filter, washed by suspending it in a small quantity of 95% ethanol, and again collected on a filter. It is 5-chlorodithio-2-pyridinecarbamic acid, carbamoylmethyl ester; M.P. 154–155° C. after crystallizations from acetonitrile and from ethyl acetate.

By the foregoing procedure, with the substitution of 13.4 g. of 2-chloro-N-ethylacetamide for the 2-chloroacetamide, the product is 5 - chlorodithio-2-pyridinecarbamic acid (ethylcarbamoyl)methyl ester; M.P. 141–152° C. after crystallizations from acetonitrile, from ethyl acetate, and from chloroform.

EXAMPLE 2

A reaction mixture is prepared by adding 8.9 g. of 4-(chloroacetyl)-1-piperazinecarboxylic acid, ethyl ester, to a chilled suspension of 10.7 g. of 5-chlorodithio-2-pyridinecarbamic acid, salt with one formula weight triethylamine, in 40 ml. of N,N-dimethylacetamide. The mixture is stirred at room temperature for one hour and diluted with 125 ml. of cold water. The insoluble product is collected on a filter, washed with water, and dried. It is 5-chlorodithio - 2 - pyridinecarbamic acid, {[4-(ethoxycarbonyl)-1-piperazinyl]-carbonyl}methyl ester; M.P. 143–144° C. after crystallization from ethyl acetate.

By the general procedure described above, using 11.5 g. of 5-chlorodithio-2-pyridinecarbamic acid, salt with one formula weight triethylamine, and 8.7 g. of 2-chloro-N,N-bis(2-methoxyethyl)acetamide, the product is 5-chlorodithio-2-pyridinecarbamic acid [bis(2-methoxyethyl)carbamoyl]methyl ester; M.P. 133–134.5° C. after crystallization from ethyl acetate.

By the general procedure described above, with the substitution of 5.6 g. of 1-(chloroacetyl)pyrrolidine for the 4-(chloroacetyl)-1-piperazinecarboxylic acid, ethyl ester, and by increasing the reaction time to 1.5 hours prior to dilution with cold water, the product is 5-chlorodithio-2-pyridinecarbamic acid, (1-pyrrolidinylcarbonyl)methyl ester; M.P. 140–141° C. after crystallization from acetonitrile.

By the general procedure described above, with the substitution of 6.1 g. of 1-(chloroacetyl)piperidine for the 4-(chloroacetyl)-1-piperazinecarboxylic acid, ethyl ester, and by increasing the reaction time to 1.5 hours prior to dilution with cold water, the product is 5-chlorodithio-2-pyridinecarbamic acid (piperidinocarbonyl)methyl ester; M.P. 129.5–130.5° C. after crystallizations from acetonitrile and from ethyl acetate.

By the general procedure described above, with the substitution of 7.4 g. of 1-(chloroacetyl)-2,6-dimethylpiperidine for the 4-chloroacetyl)-1-piperazinecarboxylic acid, ethyl ester, and by increasing the reaction time to 3 hours prior to dilution with cold water, the product is 5-chlorodithio-2-pyridinecarbamic acid [(2,6-dimethylpiperidino)carbonyl]methyl ester; M.P. 117–118° C. after crystallization from ethyl acetate.

EXAMPLE 3

With stirring at 15° C., 13.4 g. of 2-chloro-N,N-dimethylacetamide is added over a period of 8 minutes to a suspension of 30.6 g. of 5-chlorodithio-2-pyridinecarbamic acid, salt with one formula weight triethylamine, in 140 ml. of N,N-dimethylacetamide. Stirring is continued for 1.5 hours at room temperature and the mixture is then diluted with an equal volume of cold water. The insoluble product is collected on a filter, washed with water, and dried. It is 5-chlorodithio-2-pyridinecarbamic acid (dimethylcarbamoyl)methyl ester; M.P. 138–139° C. after crystallizations from 95% ethanol, from acetonitrile, and from ethyl acetate.

By the general procedure described above, using 27.6 g. of 5-chlorodithio-2-pyridinecarbamic acid, salt with one formula weight triethylamine, and 17.6 g. of 2-chloro-N,N-dipropylacetamide, the product is 5-chlorodithio-2-pyridinecarbamic acid (dipropylcarbamoyl)methyl ester; M.P. 130.5–131.5° C. after crystallization from 95% ethanol.

By the general procedure described above, using 30.0 g. of 5-chlorodithio-2-pyridinecarbamic acid, salt with one formula weight triethylamine, and 16.1 g. of 2-chloro-N,N-diethylacetamide, and increasing the reaction time to 2 hours at room temperature, the product is 5-chlorodithio-2-pyridinecarbamic acid (diethylcarbamoyl)methyl ester; M.P. 140.5–142° C. after crystallization from 95% ethanol.

EXAMPLE 4

With stirring at 15° C., a solution of 18.1 g. of 2-chloro-N,N-diisobutylacetamide in 20 ml. of N,N-dimethylacetamide is added to a suspension of 24.5 g. of 5-chlorodithio-2-pyridinecarbamic acid, salt with one formula weight triethylamine, in 120 ml. of N,N-dimethylacetamide. Stirring is continued for 1.5 hours at room temperature and the mixture is then diluted with 150 ml. of water. The insoluble product is collected on a filter, washed with water, and dried. It is 5-chlorodithio-2-pyridinecarbamic acid (diisobutylcarbamoyl)methyl ester; M.P. 89–91° C. after crystallization from acetonitrile.

By the foregoing procedure, with the substitution of 15.6 g. of 2-chloro-N,N-diisopropylacetamide for the 2-chloro-N,N-diisobutylacetamide, the product is 5-chlorodithio-2-pyridinecarbamic acid (diisopropylcarbamoyl) methyl ester; M.P. 144.5–145.5° C. after crystallizations from acetonitrile and from ethyl acetate.

EXAMPLE 5

With external cooling to maintain the temperature at 3° C., 3.3 g. of benzylamine is added to a solution of 4.9 g. of 3-(5-chloro-2-pyridyl)rhodanine in 30 ml. of acetonitrile. The temperature of the mixture is held at 0–5° C. for one hour. The insoluble product is collected on a filter.

It is 5-chlorodithio-2-pyridinecarbamic acid (benzylcarbamoyl)methyl ester; M.P. 149–151° C. after crystallization from acetonitrile.

EXAMPLE 6

A reaction mixture is prepared by adding 0.7 ml. of a mixture of concentrated aqueous ammonia and acetonitrile (1:9 by volume) to a solution of 0.25 g. of 3-(5-chloro-2-pyridyl)rhodanine in 1 ml. of acetonitrile. The mixture is held at room temperature for 30 minutes and then the insoluble product is collected on a filter, washed with water, and dried. It is 5-chlorodithio-2-pyridinecarbamic acid, carbamoylmethyl ester; M.P. 154–155° C. after crystallizations from acetonitrile and from ethyl acetate.

Starting materials

With stirring and external cooling to maintain the temperature at −10 to −20° C., 34.0 g. of chloroacetyl chloride is slowly added to a solution of 94.9 g. of 1-piperazinecarboxylic acid, ethyl ester, in 350 ml. of dichloromethane. The mixture is then stirred at room temperature for 15 minutes, washed with 0.5 N hydrochloric acid, with water, and with dilute aqueous sodium carbonate, dried, and evaporated under reduced pressure. The oily product obtained is 4-(chloroacetyl)-1-piperazinecarboxylic acid, ethyl ester, suitable for use without further purification.

Carbon disulfide 55 ml., is added to a solution of 100 g. of 2-amino-5-chloropyridine and 107 ml. of triethylamine in 250 ml. of pyridine. The mixture is allowed to stand at room temperature for 60 hours. The insoluble product which separates is collected on a filter and dried. It is 5-chlorodithio-2-pyridinecarbamic acid, salt with one formula weight triethylamine; M.P. 113–114° C. with decomposition.

A reaction mixture is prepared by adding 140.4 g. of 5-chlorodithio-2-pyridinecarbamic acid, salt with one formula weight triethylamine, to a solution of 53.6 g. of sodium chloroacetate in 1.3 liters of water and 1.6 liters of ethanol. The mixture is heated to 40° C. and then allowed to stand at room temperature for 16 hours, diluted with 2 liters of water, and acidified with acetic acid. The insoluble product is collected on a filter, washed with water, and dried. It is 5 - chlorodithio-2-pyridinecarbamic acid, carboxymethyl ester; M.P. 142–143° C. after crystallization from acetonitrile.

A solution of 87.7 g. of 5-chloroditho-2-pyridinecarbamic acid, carboxymethyl ester in 1 liter of acetic anhydride is heated at 95° C. for 30 minutes. With stirring, the mixture is poured into excess ice water. The insoluble product is collected on a filter, washed with water, and dried. It is 3-(5-chloro-2-pyridyl)rhodanine; M.P. 94–96° C. after crystallization from ethanol.

I claim:

1. A compound of the formula

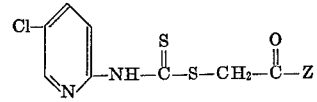

where Z is a member of the class consisting of groups of the formula

in which $R^1$ is a member of the class consisting of hydrogen, lower alkyl (lower alkoxy)lower alkyl, and benzyl and $R^2$ is a member of the class consisting of hydrogen, lower alkyl, and (lower alkoxy)lower alkyl.

2. A compound according to claim 1 which is 5-chlorodithio-2-pyridinecarbamic acid, carbamoylmethyl ester.

3. A compound according to claim 1 which is 5-chlorodithio-2-pyridinecarbamic acid, (ethylcarbamoyl)methyl ester.

4. A compound according to claim 1 which is 5-chlorodithio - 2-pyridinecarbamic acid, [bis(2-methoxyethyl)-carbamoyl]methyl ester.

5. A compound according to claim 1 which is 5-chlorodithio - 2-pyridinecarbamic acid, (dimethylcarbamoyl)-methyl ester.

6. A compound according to claim 1 which is 5-chlorodithio - 2-pyridinecarbamic acid, (diethylcarbamoyl) methyl ester.

7. A compound according to claim 1 which is 5-chlorodithio - 2-pyridinecarbamic acid, (diisopropylcarbamoyl) methyl ester.

References Cited

UNITED STATES PATENTS 3,228,949   1/1966   Risse et al. _____ 260—294.8 E

ALAN L. ROTMAN, Primary Examiner

U.S. Cl. X.R.

260—293.69, 268 C; 424—250, 266, 267